(12) United States Patent
Voelckers

(10) Patent No.: US 7,336,257 B2
(45) Date of Patent: Feb. 26, 2008

(54) METHOD FOR INPUT OF TEXT BY SELECTION OF LETTERS USING A CURSOR AND DEVICE FOR CARRYING OUT SAID METHOD

(76) Inventor: Oliver Voelckers, Im Kirschengarten 26, Trier D-54294 (DE)

( * ) Notice: Subject to any disclaimer, the term of this patent is extended or adjusted under 35 U.S.C. 154(b) by 199 days.

(21) Appl. No.: 10/501,367

(22) PCT Filed: Jan. 11, 2003

(86) PCT No.: PCT/EP03/00207

§ 371 (c)(1), (2), (4) Date: Jan. 5, 2005

(87) PCT Pub. No.: WO03/058420

PCT Pub. Date: Jul. 17, 2003

(65) Prior Publication Data

US 2005/0116927 A1    Jun. 2, 2005

(30) Foreign Application Priority Data

Jan. 14, 2002  (DE) ................................ 102 01 195

(51) Int. Cl.
*G06F 3/033* (2006.01)
*G09G 5/08* (2006.01)

(52) U.S. Cl. ....................................... 345/157; 345/168

(58) Field of Classification Search ................ 345/157, 345/168–169, 173; 715/856–859
See application file for complete search history.

(56) References Cited

U.S. PATENT DOCUMENTS

| 5,038,401 A | 8/1991 | Inotsume |
| 5,059,965 A | 10/1991 | Geiser |
| 5,270,689 A * | 12/1993 | Hermann .................... 345/157 |

(Continued)

FOREIGN PATENT DOCUMENTS

DE    37 12 360 A1    10/1988

(Continued)

OTHER PUBLICATIONS

Womack, et at.; "A text entry technique for scrolling keyboards"; Motorola Technical Developments, Motorola Inc., Schaumburg, Illinois, US, vol. 35, Jun. 1998; pp. 41-42.

*Primary Examiner*—Amr A. Awad
*Assistant Examiner*—Michael Pervan
(74) *Attorney, Agent, or Firm*—Norris, McLaughlin & Marcus

(57) ABSTRACT

The aim of the invention is development of a method for input of text by selection with a cursor from a list of letters which operates with various operating elements for control of the cursor and a device for carrying out said method. Said aim is achieved, whereby the text input by letter selection, weighted by the method of a frequency distribution of letter sequences, is carried out with a controlled graphical and/or acoustic cursor. Furthermore, a cursor control unit is connected to a micro-controller by means of a software interface, said micro-controller is connected to a ROM serving the request and a RWM buffering the input characters and a display for display of the data provided by the micro-controller. Said method for the input of text by selection of letters with a cursor on a screen is applicable in electronic devices not provided with a normal typewriter keyboard.

7 Claims, 4 Drawing Sheets

U.S. PATENT DOCUMENTS

| | | | | |
|---|---|---|---|---|
| 5,574,482 A | * | 11/1996 | Niemeier | 345/173 |
| 5,748,512 A | | 5/1998 | Vargas | |
| 5,841,373 A | * | 11/1998 | Mason | 341/21 |
| 5,963,671 A | * | 10/1999 | Comerford et al. | 382/230 |
| 6,236,389 B1 | * | 5/2001 | Imaizumi et al. | 715/788 |

FOREIGN PATENT DOCUMENTS

| | | |
|---|---|---|
| DE | 40 11 067 A1 | 10/1990 |
| DE | 199 32 776 A1 | 1/2001 |
| DE | 100 18 195 A1 | 10/2001 |
| EP | 1 061 714 A2 | 12/2000 |
| WO | 99 30222 | 6/1999 |

* cited by examiner

70 Determine representative text

71 Filter text, divide into separate words

72 Compute letter sequences for every word, count them, put result into table

73 Add counters, calculate relative frequency

| A | B | C | D |
|---|---|---|---|
| Languages | 2-letter sequences | 3-letter sequences | 4-letter sequences |
| 1 | 900 | 27000 | 810000 |
| 2 | 1800 | 54000 | 1620000 |
| 3 | 2700 | 81000 | 2430000 |
| 4 | 3600 | 108000 | 3240000 |
| 5 | 4500 | 135000 | 4050000 |
| 6 | 5400 | 162000 | 4860000 |
| 7 | 6300 | 189000 | 5670000 |
| 8 | 7200 | 216000 | 6480000 |
| 9 | 8100 | 243000 | 7290000 |
| 10 | 9000 | 270000 | 8100000 |

Fig. 9

| | a | b | c | d | e | f | g | h | i | j | k | l | m | n | o | p | q | r | s | t | u | v | w | x | y | z | ä | ö | ü | ß | _ |
|---|---|---|---|---|---|---|---|---|---|---|---|---|---|---|---|---|---|---|---|---|---|---|---|---|---|---|---|---|---|---|---|
| a | 1 | 4 | 0 | 14 | 4 | 4 | 3 | 20 | 9 | 1 | 1 | 4 | 3 | 15 | 0 | 5 | 0 | 26 | 2 | 21 | 0 | 5 | 13 | 0 | 0 | 4 | 0 | 0 | 0 | 0 | 73 |
| b | 14 | 0 | 0 | 2 | 11 | 1 | 0 | 0 | 1 | 0 | 0 | 4 | 3 | 2 | 11 | 0 | 0 | 2 | 1 | 2 | 1 | 0 | 0 | 0 | 0 | 1 | 5 | 0 | 6 | 0 | 39 |
| c | 11 | 0 | 0 | 0 | 22 | 0 | 0 | 36 | 11 | 0 | 0 | 0 | 0 | 0 | 4 | 1 | 0 | 4 | 34 | 0 | 0 | 12 | 0 | 0 | 0 | 0 | 5 | 1 | 1 | 0 | 2 |
| d | 7 | 1 | 2 | 0 | 15 | 0 | 0 | 2 | 6 | 0 | 0 | 2 | 1 | 50 | 3 | 6 | 0 | 16 | 1 | 0 | 114 | 1 | 0 | 2 | 0 | 0 | 2 | 0 | 0 | 0 | 73 |
| e | 0 | 52 | 2 | 61 | 9 | 9 | 59 | 42 | 51 | 0 | 3 | 44 | 26 | 46 | 5 | 6 | 0 | 53 | 19 | 1 | 1 | 9 | 22 | 2 | 0 | 15 | 0 | 0 | 1 | 4 | 58 |
| f | 9 | 0 | 0 | 0 | 1 | 0 | 0 | 0 | 1 | 0 | 0 | 4 | 2 | 7 | 4 | 0 | 0 | 5 | 2 | 19 | 1 | 9 | 0 | 0 | 0 | 0 | 0 | 6 | 0 | 0 | 30 |
| g | 4 | 0 | 0 | 0 | 0 | 1 | 0 | 0 | 1 | 0 | 0 | 23 | 0 | 0 | 3 | 1 | 0 | 4 | 4 | 2 | 0 | 5 | 0 | 0 | 0 | 1 | 2 | 0 | 0 | 0 | 24 |
| h | 10 | 2 | 0 | 5 | 29 | 0 | 6 | 6 | 0 | 0 | 0 | 1 | 0 | 45 | 4 | 0 | 0 | 5 | 4 | 4 | 1 | 0 | 0 | 0 | 0 | 10 | 7 | 6 | 0 | 0 | 22 |
| i | 1 | 17 | 0 | 29 | 81 | 7 | 6 | 0 | 0 | 0 | 0 | 23 | 20 | 16 | 3 | 0 | 0 | 9 | 28 | 4 | 22 | 0 | 10 | 0 | 0 | 0 | 0 | 0 | 0 | 0 | 28 |
| j | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 4 |
| k | 1 | 0 | 0 | 1 | 7 | 0 | 0 | 5 | 1 | 0 | 0 | 7 | 3 | 14 | 10 | 0 | 0 | 7 | 0 | 1 | 0 | 3 | 0 | 0 | 0 | 0 | 2 | 7 | 0 | 0 | 28 |
| l | 24 | 6 | 0 | 0 | 39 | 0 | 0 | 12 | 18 | 0 | 0 | 13 | 5 | 0 | 14 | 0 | 0 | 2 | 1 | 0 | 1 | 0 | 0 | 0 | 0 | 0 | 0 | 2 | 7 | 0 | 25 |
| m | 10 | 2 | 0 | 1 | 20 | 0 | 0 | 0 | 2 | 0 | 0 | 8 | 0 | 0 | 2 | 7 | 0 | 4 | 0 | 0 | 7 | 63 | 20 | 0 | 0 | 0 | 2 | 2 | 2 | 0 | 41 |
| n | 48 | 0 | 0 | 0 | 191 | 0 | 2 | 0 | 6 | 0 | 0 | 75 | 5 | 15 | 10 | 0 | 0 | 9 | 17 | 12 | 3 | 0 | 0 | 0 | 0 | 0 | 0 | 0 | 0 | 0 | 7 |
| o | 0 | 0 | 0 | 0 | 0 | 5 | 0 | 0 | 0 | 0 | 0 | 16 | 5 | 5 | 12 | 6 | 0 | 13 | 12 | 12 | 0 | 0 | 0 | 0 | 0 | 0 | 0 | 0 | 0 | 0 | 11 |
| p | 0 | 0 | 0 | 0 | 1 | 0 | 0 | 8 | 0 | 0 | 0 | 2 | 0 | 0 | 2 | 0 | 0 | 2 | 0 | 0 | 0 | 0 | 0 | 0 | 0 | 0 | 0 | 0 | 0 | 0 | 12 |
| q | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| r | 23 | 4 | 2 | 9 | 173 | 1 | 8 | 14 | 4 | 0 | 0 | 9 | 1 | 2 | 18 | 1 | 0 | 1 | 31 | 12 | 8 | 0 | 0 | 1 | 0 | 2 | 0 | 0 | 9 | 0 | 9 |
| s | 23 | 0 | 1 | 2 | 22 | 0 | 7 | 6 | 14 | 0 | 0 | 24 | 0 | 0 | 26 | 0 | 0 | 0 | 16 | 11 | 0 | 0 | 6 | 0 | 0 | 9 | 1 | 2 | 3 | 0 | 64 |
| t | 19 | 5 | 0 | 0 | 19 | 12 | 7 | 17 | 6 | 0 | 0 | 33 | 1 | 11 | 11 | 0 | 0 | 0 | 19 | 68 | 0 | 15 | 0 | 0 | 0 | 0 | 4 | 1 | 4 | 1 | 28 |
| u | 34 | 4 | 0 | 6 | 10 | 3 | 1 | 0 | 0 | 0 | 0 | 1 | 0 | 1 | 1 | 0 | 0 | 5 | 3 | 3 | 1 | 24 | 0 | 0 | 0 | 2 | 1 | 2 | 0 | 0 | 25 |
| v | 0 | 0 | 0 | 0 | 1 | 0 | 0 | 0 | 0 | 0 | 0 | 0 | 0 | 0 | 5 | 0 | 0 | 0 | 1 | 0 | 0 | 8 | 0 | 0 | 0 | 0 | 0 | 0 | 0 | 0 | 38 |
| w | 0 | 0 | 0 | 0 | 1 | 1 | 0 | 2 | 0 | 0 | 0 | 0 | 2 | 5 | 0 | 0 | 0 | 4 | 6 | 8 | 9 | 0 | 6 | 0 | 0 | 2 | 1 | 2 | 0 | 0 | 27 |
| x | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| y | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| z | 0 | 0 | 0 | 0 | 0 | 4 | 0 | 0 | 0 | 0 | 0 | 0 | 1 | 0 | 0 | 0 | 0 | 0 | 0 | 1 | 1 | 0 | 0 | 0 | 0 | 0 | 0 | 0 | 1 | 0 | 14 |
| ä | 0 | 0 | 0 | 0 | 0 | 1 | 0 | 0 | 0 | 0 | 0 | 0 | 0 | 7 | 1 | 0 | 0 | 0 | 0 | 0 | 0 | 0 | 0 | 0 | 0 | 0 | 0 | 0 | 0 | 0 | 1 |
| ö | 0 | 0 | 0 | 0 | 3 | 9 | 0 | 0 | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ü | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 1 | 0 | 1 |
| ß | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| _ | 4 | 4 | 0 | 46 | 92 | 3 | 29 | 47 | 16 | 0 | 0 | 4 | 27 | 170 | 4 | 4 | 0 | 99 | 40 | 76 | 3 | 1 | 4 | 0 | 3 | 0 | 0 | 0 | 0 | 0 | 0 |

METHOD FOR INPUT OF TEXT BY SELECTION OF LETTERS USING A CURSOR AND DEVICE FOR CARRYING OUT SAID METHOD

FIELD OF THE INVENTION

The invention describes a procedure for text input by selecting letters with a cursor visible on a screen that can be used with compact electronic devices that cannot be equipped with a normal typewriter-style keyboard due to lack of space and therefore offer only a secondary text input function with cursor keys or similar input controls; it also describes an apparatus to implement this procedure.

BACKGROUND OF THE INVENTION

Modern electronic devices with a software operating system and a display often require a text input function but lack a full typewriter-style keyboard. A number of ersatz solutions have been developed that allow text input by means of a selection of letters with a cursor.

The most simple solution consists of a letter set shown on a display, with a cursor that can be controlled in two or four directions with a joystick or with keys. In order to advance the cursor by several positions, the keys have to be pressed several times accordingly. A further developed solution on this basis allows to keep the keys or the joystick activated for a certain minimum delay, leading to an automatic movement of the cursor in specified time intervals (auto-repeat function).

In order to move the cursor over longer distances, the speed of the cursor movement can be increased gradually (acceleration).

Touch screens, digitizing tablets and sensor strips allow to position a cursor directly at the desired position.

Predictive Text Input can guess a complete input sequence from a reduced information (9 keys instead of 26) on the basis of dictionary. This solution is in common use with mobile phones.

While the solution with two cursor keys is simple to manufacture and easy to learn, it requires numerous key presses or delays for each input character, so it is only accepted as a makeshift solution.

The cursor control with auto-repeat resp. acceleration makes it easier to traverse longer distances. The fast movement, however, leads to the common situation that the cursor surpasses the target so that the cursor position must be corrected tediously. This is because it is impossible to slow down the cursor movement.

While touch screens, digitizing tablets and sensor strips allow the direct selection of a cursor position, the large number of input alternatives leads to errors such as unintentionally selecting a position directly adjacent to the desired target position.

Predictive text input improves data input with numeric keypads significantly, as long as the input is limited to the vocabulary of its dictionary. In order to allow other input sequences, predictive text input must be turned off.

The known text input functions with a cursor control make use of a cursor with a constant size as well as targets (letter sets) with an identical size. Only predictive text input limits the possible input sequences to those that are assumed on the basis of an electronic dictionary.

Words of natural language contain some redundancy, i.e. after any letter only specific subsequent letters are possible to form meaningful words. For example, in the English and German languages words beginning with "Qua" often continue with a "d", "n" or "r", but not with an "a" or "q".

The well-known and existing text input cursor control systems offer numerous letters for a selection, although these cannot be used for meaningful words at all. On the other side, predictive text input limits input sequences to words in a dictionary, although other letter sequences may be required for name or address information.

A procedure to support text entry by selecting letters with a cursor from a list should function with various cursor control hardware. It should also allow rapid input without limiting the vocabulary as predictive systems do.

The aim of the invention is to design a system for text entry by selecting letters from a list with a cursor in a user-friendly way, so that users do not have to memorize special input sequences and anybody can use it without special training.

SUMMARY OF THE INVENTION

The invention is based on the task to develop a procedure for text input by selecting letters from a list with a cursor that works with a variety of user interface elements for cursor control.

The task is solved as shown in the independent claims.

The invented procedure to enter text by selecting letters from a list of letters with a cursor is based on a selection file that has been generated previously in a way according to the invention. This selection file contains letter sequences with weight assignments that have been produced by means of the mathematical method of frequency statistics. A graphical or audible cursor uses this selection file to offer selections of letters. This procedure is based on the inventive step to utilize the uneven distribution of letters in texts for text entry.

According to the invention, the probability of the occurrence of certain letter combinations is calculated by means of a table, the statistical frequencies are automatically computed from a typical sample text and made available for the letter selection according to the invention. Depending on the probability of their occurrence in a certain context the cursor appears larger on expected letters than on unlikely letters. This allows to enter letter sequences of common texts faster and with fewer typing errors.

BRIEF DESCRIPTION OF THE DRAWINGS

The invention shall be described in detail by reference to an example. The accompanying drawings show:

FIG. 9: frequency table of a German sample text

DETAILED DESCRIPTION OF THE INVENTION

Figure 1:
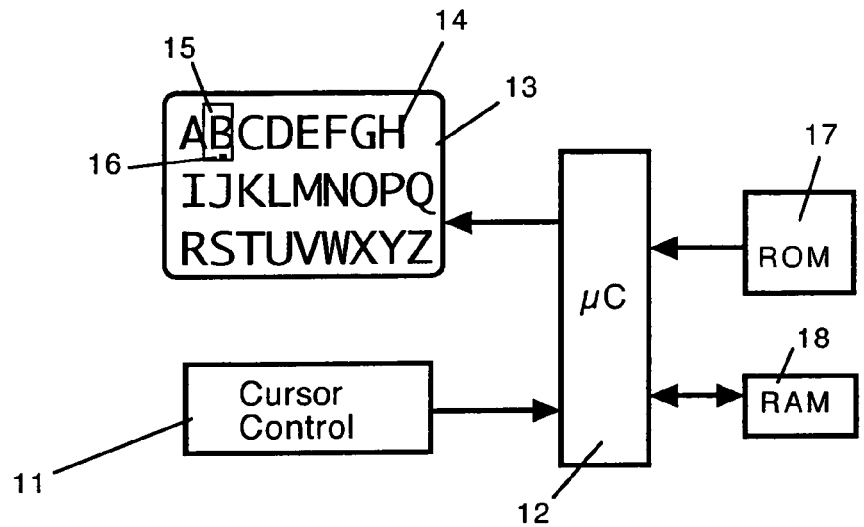
FIG. 1: block diagram of the components of the apparatus according to the invention to implement the procedure

FIG. 1 shows a block diagram of the apparatus according to the invention. A cursor control unit 11 is connected to a display 13 via a control unit such as a micro controller 12.

The display 13 shows a letter set 14 completely or partially. This letter set 14 contains all characters that can be entered in this situation. The cursor 15 can be moved across the letter set 14 by means of the cursor control unit 11. An indicator 16 formed like a small symbol or mouse pointer within the area of the cursor 15 can optionally deliver a precise feedback to the activation of the cursor control unit 11.

The cursor 15 is displayed on the letter set in variable size depending on the input sequence. To this end, the micro controller 12 stores the last entered letters in a random access memory 18. The micro controller 12 compares this typically incomplete word stored in the random access memory 18 with a catalogue of frequencies of possible input sequences from the read only memory 17.

This comparison allows the micro controller 12 to predict which letters are more likely and which are less likely to follow. Depending on this probability, the contours of the letters of the letter set 14 are highlighted with a variable size when they are selected by means of the cursor 15.

The cursor control unit 11 can in its simplest form just consist of two arrow keys, but it can also consist of a joy stick, a rotary emitter (jog dial), a sensor strip (e.g. linear potentiometer), a touch screen, a mouse etc. The display 13 must be capable of displaying a subset of the letter set 14 which consists at least of a single character and the cursor 15 and as a maximum the complete repertoire.

It is sufficient if the random access memory 18 has a capacity of approx. 20 characters (20 bytes) und it may lose its content when powered off (volatile memory). The read-only memory 17 needs to have a capacity of at least a few thousand characters (20 to 1000 kilo bytes) in order to store the letter sequence frequencies and it must be non-volatile memory (type ROM or EPROM, hardware storage or firm-ware).

Figure 2:
FIG. 2: screen display of a letter list with identical size
Figure 3:
FIG. 3: screen display of letter lists with variable sizes
Figure 3:
Figure 3:
Figure 4:
FIG. 4: another screen display of a letter list with variable size

FIGS. 2, 3 and 4 illustrate samples of screen displays of the user interface. FIG. 2 shows a list of letters with a subset from the letter set, all letters shown with identical width. That is equivalent to a cursor control for letter selection according to the state of art (prior art).

The cursor can reach any visible letter theoretically within the same time, although depending on the implementation of the cursor control unit a longer distance may require a longer time. (E.g. in the example of FIG. 2 from the position "b", the "c" is faster to access than the "g", but the difference of the movement from "b" to "g" compared to "b" to "h" is minimal.)

FIG. 3 clearly shows the implications of the invention. The letters are shown with a variable width, so that in this example the cursor passes more rapidly over the narrowly displayed letters "c" or "d" than over the letters "b" or "g". The three lines of FIG. 3 show three states that follow each other. The cursor is moved to the right, moving the indicator 16 (introduced in FIG. 1) with a constant speed to the right. Exactly when the indicator touches the edge of the cursor 15 outline, the cursor advances by one letter. This behavior makes it easier to position the cursor on the widely displayed letters than on the narrowly displayed letters.

FIG. 3 illustrates a situation where the letters "b", "e", "g" and "h" have been determined as probable following letters, while the letters "a", "c" and "d" have been determined as unlikely. The variable size allows to hit the expected letters faster and easier compared to the less likely letters. In the majority of cases, the larger displayed letters will be selected, because the letter sequences are not randomly distributed in natural language texts. This means the selection is faster and the risk of input errors is reduced.

According to Fitt's Law, targets can be hit with a cursor control faster in proportion to the size of the target. It is realistic to expect that the desired letters can be displayed on average 30 to 60% larger with the invention than without. This allows a rough estimation of an increased input speed by 30 to 60% with the invention.

FIG. 4 displays another situation with the same user interface. After every letter input, the probabilities of the specific following letter are computed again by means of the table 17 of FIG. 1, allowing a corresponding update of the letter set display and their specific sizes.

The FIGS. 3 and 4 show a variable width of letters changing after every input. As an alternative to this, it would be possible to display all letters of the letter set with a constant size as in FIG. 1 and have a variable size cursor, or it would be possible to have letters with variable height or both with variable height and variable width for every letter.

The best solution depends on the type of cursor control and the display: A two-dimensional cursor control (e,g, joystick or mouse) suggests a two-dimensional adaptation, e.g. width and height. If the cursor can only be moved horizontally or vertically, then a variation only along this axis is sensible.

Figure 5:
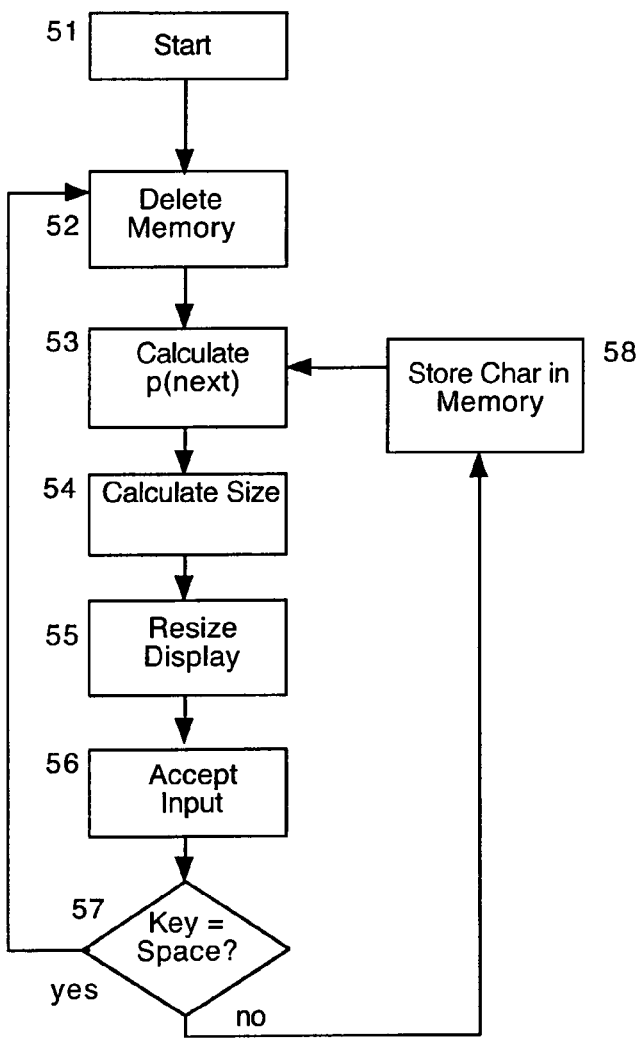
FIG. 5: Flow chart of the procedure's steps during input

FIG. 5 demonstrates the steps performed during input. After the start 51, the memory with the current input sequence (no. 18 in FIG. 1) is cleared. Then the micro processor 12 computes the probability of occurrence for every letter of the letter set 14 based on the catalogue of input sequence frequencies from the read-only memory 17 (step 53). According to these probabilities, the relative sizes are computed for every displayed letter (step 54) and the display is updated (step 55).

Step 56 means that the cursor movements are handled until the next letter is selected with a key press, mouse click etc. depending on the type of cursor control unit. If the next letter is a space or a word dividing character, the buffer for the input sequence is cleared (step 57 and then 52). However if the word is continued (step 57 and then 58) then the new letter is also memorized in the buffer, so that it can be taken into account upon the next calculation of word probabilities with step 53.

Figure 6:
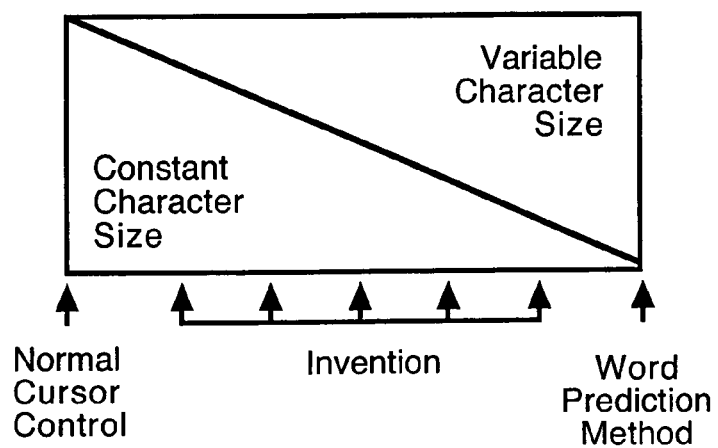
FIG. 6: Comparison demonstrating the adjustable effect

FIG. 6 discriminates the invention against known text input cursor control systems and the known procedure of word prediction. According to common cursor control systems for text input, all letters are displayed with an identical sized cursor as shown in FIG. 2 and characterized at the left side of FIG. 6. By contrast, the word prediction method restricts the selection of letters that are practically assigned either 0% or 100%, as characterized at the right side of FIG. 6.

The effect of the invention, however, may be scaled to any level, as characterized in the middle range of FIG. 6. Depending on how strong the influence of the letter probabilities to the display is elected, the letter width can vary less (left side of the diagram) or more (right side of the diagram).

Figures 7, 8:
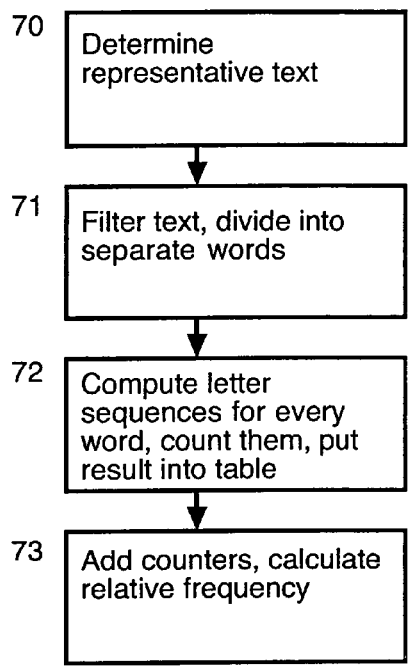
FIG. 7: procedure steps to generate a frequency table
FIG. 8: Memory requirements of some frequency tables

FIG. 7 lists the necessary steps to generate the table with the probabilities of the letter sequences. According to the invention, this procedure is performed automatically, if a long and representative text is available that contains similar sequences as the planned content (step 70). A typical text with a few ten thousand characters is sufficient. The easiest method is to make use of texts that have already been entered by users in practice. If texts for different languages shall be entered, then a separate table should be generated for each language.

First of all, this representative text must be filtered as a preparation for analysis, by converting upper-case letters to lower-case letters and removing all special characters that are irrelevant for the separate words (step 71). By recognizing spaces between words as word separators the text is changed into a word list.

Within this word list, the letter sequences for every word are determined and every occurrence of a sequence is counted (step 72). Depending on the available memory, longer or shorter letter sequences may be considered. In practice, sequences of at least two and no more than six letters should be considered. Longer letter sequences result in more precise statistics and optimized letter cursor sizes.

For example, if the letter sequences in the word "rokoko" are counted like this, then counting two-letter sequences would deliver "_r", "ro", "ok", "ko", "ok", "ko", i.e. once "_r" and "ro" and twice "ok" and "ko"; the character indicating a word separator. Counting three-letter sequences would deliver "_ro", "rok", "oko", "kok", "oko", i.e. once "_ro", "rok", "kok" and twice "oko".

Finally, step 73 of FIG. 7 symbolizes the calculation of relative probabilities from the statistic counters by setting individual occurrences into relation with the total count. For example, if in the representative text the letter "g" is followed an "r" three times, followed by an "u" once and no other letters, then the probability of a "g" followed by an "r" appears as ¾ and that of a "g" followed by a "u" appears as ¼.

FIG. 8 lists the required memory for the frequency lists (no. 17 in FIG. 1) depending on the length of letter sequences. This is based on an alphabet of 30 letters. Under these conditions, a table with two-letter sequences requires 30 times 30 characters, i.e. 900 bytes. A three-letter sequence table would require accordingly 30×30×30=27,000 bytes. If tables for several languages shall be stored, the memory requirements multiply accordingly. FIG. 8 demonstrates that the memory requirements for the tables lie in a range that is perfectly acceptable for common electronic devices.

FIG. 9 shows a table with countings of two-letter sequences generated from a 5000 character long sample text in German language. The top line lists each beginning letter and the most left column shows the following letter. This counting reveals for example, that the sample text contained 14 occurrences of the letter sequence "ab" and 4 occurrences of the letter sequence "ba".

Furthermore, FIG. 9 reveals that the sample text contained no occurrences of "dc" or "dg", but 61 occurrences of "de".

If this tendency would be confirmed with a longer representative text, the probability of the sequence "de" would be considered as high and those of the sequences "dc" and "dg" as low. Therefore, after the entry of the letter "d" the letter set would be displayed in a manner that an "e" is easily reachable and the letters "c" and "g" are not so easy reachable. In other words, an "e" would then occupy a larger cursor area and "c" as well as "g" would only occupy the minimum area.

The difference between minimum and maximum size is defined in a parameter according to FIG. 6. It is possible to implement this as a user-defined preference, that could perhaps be offered as a choice between 0%, 30%, 60% and 90% (i.e. 90% difference between largest and smallest letter). The size of the complete displayed letter set is constant, only the shares of individual letters are flexible.

Compared to state-of-the-art cursor controls for text input the invention offers a significantly faster input speed. No explanations are required to use it. If the effect is set to a weak level, it might even go unnoticed and will still improve input speed.

By contrast to the word prediction system, the invention does not limit input sequences in any way. Rare letter sequences are only slowed down by means of a smaller representation. The invention is easy to adapt automatically to different languages, as long as a representative text is available. The generated frequency tables require only minimal space and are scalable to either higher precision or compact size.

The system is adjustable to any display sizes, whether they show the complete alphabet or only a subset of it. In addition, the system can be adapted to all kinds of cursor controls, with arrow keys in two or four directions, joysticks, mice, sensor strips and similar.

The procedure is preferable with compact electronic devices which cannot be equipped with a full typewriter keyboard because of lacking space and therefore contain only a makeshift text input system with cursor keys or similar input devices.

DEFINITIONS

11 Cursor Control Unit
12 Micro Controller
13 Display
14 Letter Set
15 Cursor
16 Indicator
17 Read Only Memory
18 Random Access Memory

The invention claimed is:

1. A method for inputting text using a cursor comprising:
    selecting a character from a character set for input as text using a graphical cursor defining a display region wherein the cursor includes an indicator movable across the display region of the cursor, wherein the character set includes a plurality of characters weighted according to frequency statistics of character sequences, wherein the selecting includes:
    moving the indicator a distance across the display region of the cursor to advance the cursor from at least one first character to at least one adjacent, second character, wherein the weighting on the first character defines the distance.

2. The method of claim 1 further comprising:
    deriving frequencies of occurrences of all possible character combinations from a representative sample text;
    computing, after a first text input and based on a text sequence including the first text input and at least one text input preceding the first text input, probabilities of the respective characters for input as text following the first text input; and
    sizing the display region of the cursor on a character on which the cursor is positioned based on the probability of the character for input as text following the first text input.

3. The method of claim 1, wherein the display region of the cursor is rectangularly shaped and moveable at least one of horizontally and vertically across the characters of the character set, wherein the characters vary in size in accordance with the weighting,
    wherein the indicator is dot-shaped and moveable horizontally and vertically within the display of region the cursor.

4. The method of claim 1 further comprising;

sizing the display region of the cursor for the respective characters of the character set in accordance with the weighting, wherein a difference between a largest and smallest size of the display region of the cursor is selectable by a user.

5. The method of claim 4, wherein the difference is in a range between zero and a predetermined difference.

6. The method of claim 1 further comprising:

highlighting a character on which the cursor is positioned; and sizing the display region of the cursor on the character on which the cursor is positioned in proportion to a probability of occurrence of the character on which the cursor is positioned, wherein the probability of occurrence of the character on which the cursor is positioned is computed based on a preceding text input sequence and a character sequence frequency table.

7. An apparatus for inputting text using a cursor comprising:

a controller including a memory and coupled to a cursor control unit and a display;

wherein the display includes a character set including a plurality of characters and a cursor, wherein the characters are weighted according to frequency statistics of character sequences and wherein the cursor is a graphical cursor defining a display region wherein the cursor includes an indicator movable across the display region of the cursor; and wherein the control unit is operable for controlling movement of the indicator for advancing the cursor across at least one first character to at least one adjacent, second character, wherein the weighting on the first character defines a distance across the display region of the cursor and wherein moving the indicator over the distance advances the cursor across the first character.

* * * * *